United States Patent [19]

Arman

[11] Patent Number: 5,221,868
[45] Date of Patent: Jun. 22, 1993

[54] ELECTRICALLY ASSISTED GRAVITY POWERED MOTOR

[76] Inventor: Walter C. Arman, 4728 Columbia Pike, Franklin, Tenn. 37064

[21] Appl. No.: 855,515

[22] Filed: Mar. 20, 1992

[51] Int. Cl.⁵ .................. H02K 7/06; F01B 21/04; F03G 3/00
[52] U.S. Cl. .................................. 310/81; 60/716; 187/6; 187/33; 187/7
[58] Field of Search ............... 310/59, 74, 81, 75 D; 74/847, 848, 572; 206/301, 18; 368/76, 77, 169, 170, 206, 208; 185/33, 32, 27, 6, 7; 60/716, 721; 415/916

[56] References Cited

U.S. PATENT DOCUMENTS 2,989,839  6/1961  Croy ................................ 185/7

FOREIGN PATENT DOCUMENTS 2934111  3/1981  Fed. Rep. of Germany ........ 185/27

Primary Examiner—Steven L. Stephan
Assistant Examiner—Robert Nappi
Attorney, Agent, or Firm—Abe Hatcher

[57] ABSTRACT

An electrically assisted gravity powered motor, has a plurality of hexagonal arms with two opposing shorter sides describing a circle as the arms are rotated by an interrupted axle running between arms but leaving room inside the hexagon for weights on tracks between the two opposing sides to be moved by a fixed motor at one end of each track so as to go along the track through an axis in an unrestricted manner from one end to the other end and back while the arm is electrically rotated continuously in a 360° circle to generate mechanical energy which may be used to run a vane pump or the like or to generate more electricity.

5 Claims, 2 Drawing Sheets

ELECTRICALLY ASSISTED GRAVITY POWERED MOTOR

BACKGROUND OF THE INVENTION

1. Field of the Invention

This invention relates to energy transfer. More particularly, it relates to using electrical energy to create mechanical energy and a device for doing same.

2. Description of the Prior Art

Pinson, in U.S. Pat. No. 4,926,107, describes a rotating hub with spokes. Each spoke has an associated mass which can be moved backward and forward along a track as far as the hub by a motor as the hub is rotated or turned 360°. The motor may serve as the mass. Mechanical energy generation by the Pinson apparatus is limited because the mass cannot be moved beyond the hub.

SUMMARY OF THE INVENTION

After extended investigation I have solved this problem by developing an electrically assisted gravity powered motor and a process for its use, the energy multiplier being made up of a plurality of rotatable arms, preferably at least 3 and for best efficiency from 5 to 24, each in a hexagonal frame and each having a fixed motor on a track at one end of the track and at least one weight on the track adapted to move therealong back and forth from one side on an axis of a circle of which the arm forms a diameter to the other and back as the arm rotates around the axis. According to my invention there is no axle or hub to obstruct movement of the weight or weights back and forth across the axis because according to the invention the axle is affixed to both sides of each frame or arm at the axis so that it does not go through the frame or arm, that is, does not go within the bounds of the hexagon. Instead, the axle is an interrupted axle and goes between each two adjoining arms as well as before the first arm and after the last. The axle may continue on at the end or down side to operate a vane pump or the like. A 220-volt line coming from an electrical energy source supplies electricity for rotating the arms and to t motors for moving the weights back and forth along the tracks past the center or axis from a starting end of the arm or frame or from one of the two opposing, preferably shorter, sides to the other during 180° of the rotation and then back to the starting end during the other 180°, with the rotation of all of the arms continuing in a synchronized manner until stopped, thereby generating increasing amounts of mechanical energy. The plurality of arms should be synchronized at the start. The synchronization at the start and during the operation may be controlled manually or by computer operation.

To get electricity to all of the motors, I run an electrical line through the interrupted axle to the first arm, then along the inside of the arm to the fixed-position motor at one peripheral or circumferential end of its track and then on out of the other side and back into the second portion of the interrupted axle and then inside the axle between the first and second arms, whence I run the line similarly to the motors of the rest of the plurality of arms.

BRIEF DESCRIPTION OF THE DRAWING

For a better understanding of my invention reference will now be made to the drawing, in which.

DETAILED DESCRIPTION

Figure 1:
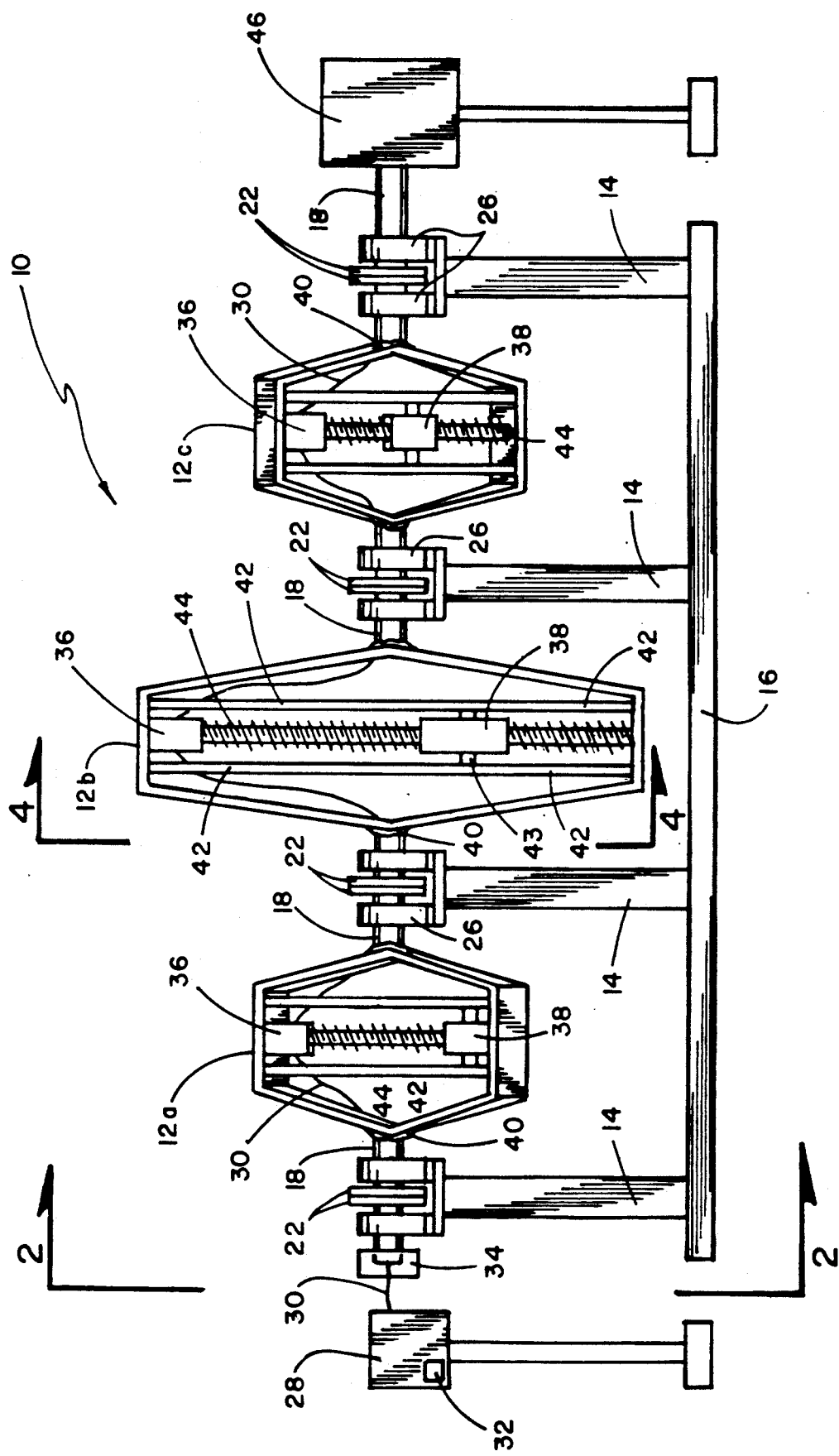
FIG. 1 is a front view of a plurality of electrically assisted gravity powered motor arms according to the invention.
Figure 4:
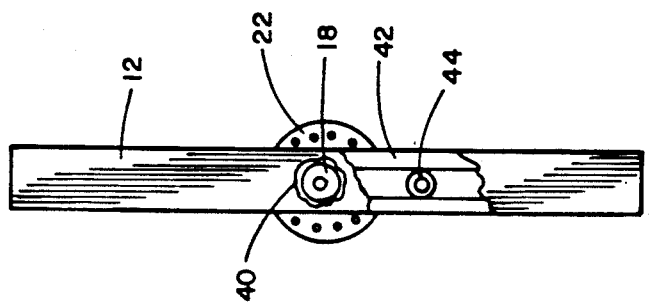
FIG. 4 is a schematic view, partially cut away, taken at 4—4 of FIG. 1.
Figure 7:
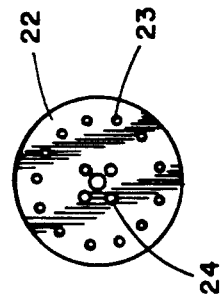
FIG. 7 is a side view of a flange such as shown as a part of FIGS. 1, 2 and 4—6.
Figure 5:
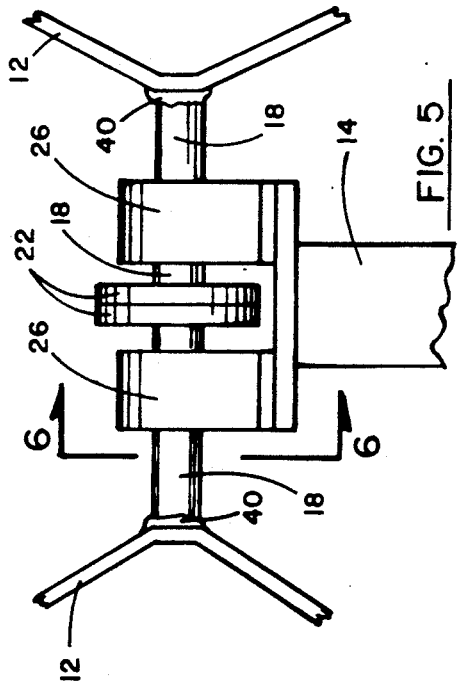
FIG. 5 is a side view of an axle, clamp and flange assembly unit of a portion of the energy multiplier of the invention (one of a plurality of repeated units).

In the drawing, the electrically assisted gravity powered motor of the invention is madeup of a plurality of arms, in FIG. 1, a representative three, 12a, 12b and 12c, each of which has a track 42 running between two opposing shorter sides of its hexagonal shape, a fixed-position motor 36 at one end of each track and a weight or plurality of weights 38 on each track which move back and forth along the track via a roller 43 and in conjunction with a ball-threaded screw or the like 44, as the arms 12a, 12b, 12c, or more, rotate by means of an interrupted axle 18, which may be supported by mounts 14, and are turned or rotated by electricity coming via switch 32 and line 30 from electrical energy source 28. As depicted in FIG. 8, each section of the interrupted axle 18, which permits a weight or weights 38 to move across an axis of the arms 12a, 12b, 12c in going from one end to the other (see FIGS. and 3) as the arms rotate, is made up from center outward of an axle (center portion) 18, threaded holes 19, bearings 27, clamps 26 and flanges 22. In the flanges of FIG. 7 are depicted circumferentially arranged peripheral holes 23 and inner bolts 24. Looking along the length of one section of the interrupted axle, as shown in FIG. 5, sections are joined together at flanges 22 and covered by clamp arrangement 26, which may be of a single piece or of two parts. Each end of each section of the interrupted axle 18 is joined in the arm 12 at its axis, for example by welding as at 40 (FIGS. 1 and 5).

Figure 3:
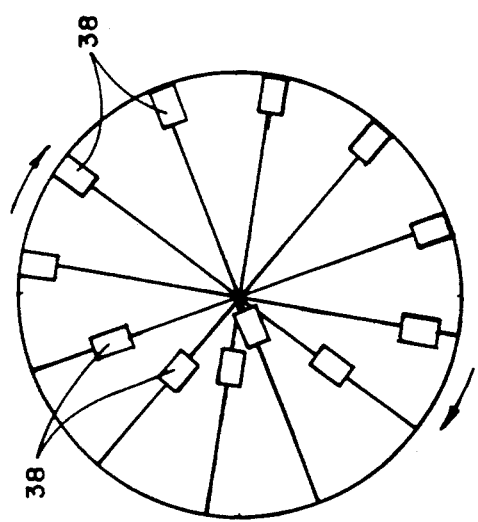
FIG. 3 is a schematic view showing representative positions of a weight on twelve different arms as the arms rotate, showing only half of each arm in order to illustrate how the weights stay near the circumference for 180° or half of the circle for the going down portion of the rotation.
Figure 6:
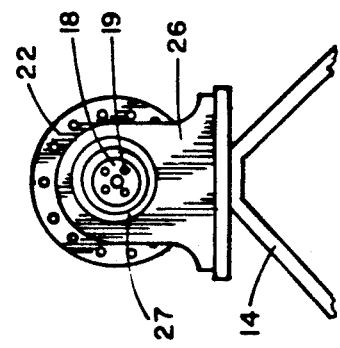
FIG. 6 is an end view taken at 6—6 of FIG. 5.
Figure 2:
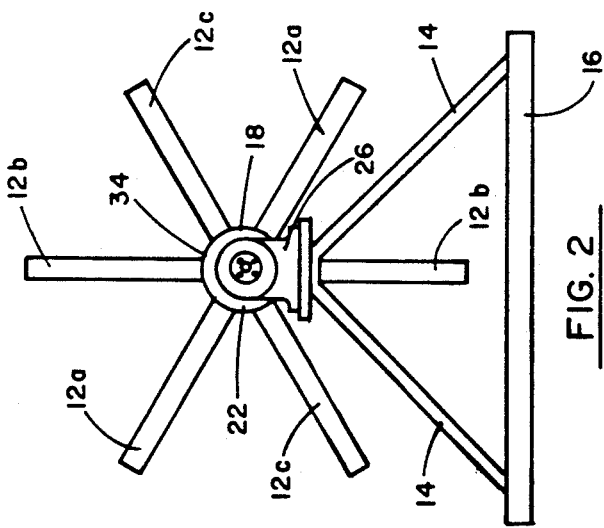
FIG. 2 is a schematic view taken at 2—2 of FIG. 1.

FIG. 3 shows schematically the representative different positions along the length of each arm for the weight or weights 38 as they are moved by the motors 36 on each arm by electricity coming through line 30 coming from electricity energy source via slip ring 34 while the arms (here 12 in number) are being rotated.

Although many other uses of the energy multiplier of the invention are contemplated, if it is desired to use the energy at the time of generating, axle 18 after terminal arm 12c may be connected to vane pump 46 to run it.

While the invention has been described in terms of certain preferred embodiments thereof, the claims appended hereto are intended to encompass all embodiments which fall within the scope of the invention.

Having thus described my invention and certain preferred embodiments thereof, I claim:

1. An electrically assisted gravity powered motor comprising a plurality of 360°-rotatable arms in line along a single axis, said arms being hexagonal in shape, having two opposing shorter sides and two longer sides, said two shorter sides being adapted to trace a circle as they revolve around said axis with each arm forming a diameter of the circle, each arm having a track running between two opposing shorter sides of hexagon, an interrrupted axle going between each two adjoining arms of said plurality of arms, before a first arm and after a last arm of said plurality of arms and connected to said arms on both sides of each at said axis where said two longer sides of said hexagon meet whereby said arms are rotated by turning of said interrupted axle, said interrupted axle being perpendicular to the force of gravity, a fixed motor at one end of each arm, at least one weight on each track adapted to move from one end of the track through said axis to an opposite end and back without obstruction as said shorter sides trace said circle while said arms are continuously rotated and electrical means for rotating said arms and running said fixed motor at one end of each arm to move said at least one weight on each track of said plurality of arms, said electrical means comprising an electrical line coming from an electrical energy source to said axle, said line continuing through the interrupted axle to a first arm of said plurality of arms, then along the inside of said arm to said fixed motor at one end of the track of said arm and then on out of the other side of said first arm and back into a portion of the interrupted axle between said first arm and a second arm going inside the axle and in a like manner to the motors of the rest of the plurality of arms for energizing said motors to move each weight back and forth, to change the center of gravity of the arm and cause said interrupted axle to rotate.

2. The electrically assisted gravity powered motor of claim 1 wherein each track has a ball screw in association therewith.

3. The electrically assisted gravity powered motor of claim 1 wherein said plurality of 360°-rotatable arms comprises at least 3.

4. The electrically assisted gravity powered motor of claim 1 wherein said axle comprises from the axis radially outward threaded holes, bearings, clamps and flanges.

5. The electrically assisted gravity powered motor of claim 1 wherein said interrupted axle is joined axially to said arms by welding.

* * * * *